US010078326B2

(12) United States Patent
Duca et al.

(10) Patent No.: US 10,078,326 B2
(45) Date of Patent: Sep. 18, 2018

(54) APPARATUS AND METHOD FOR EVENT DETECTION TO SUPPORT MOBILE NOTIFICATIONS RELATED TO INDUSTRIAL PROCESS CONTROL AND AUTOMATION SYSTEM

(71) Applicant: Honeywell International Inc., Morris Plains, NJ (US)

(72) Inventors: Andrew Duca, Phoenix, AZ (US); Matthew G. Burd, Calgary (CA)

(73) Assignee: Honeywell International Inc., Morris Plains, NJ (US)

( * ) Notice: Subject to any disclaimer, the term of this patent is extended or adjusted under 35 U.S.C. 154(b) by 352 days.

(21) Appl. No.: 14/868,905

(22) Filed: Sep. 29, 2015

(65) Prior Publication Data

US 2016/0334765 A1 Nov. 17, 2016

Related U.S. Application Data

(60) Provisional application No. 62/161,536, filed on May 14, 2015, provisional application No. 62/161,542, (Continued)

(51) Int. Cl.
G05B 15/02 (2006.01)
G05B 19/418 (2006.01)

(52) U.S. Cl.
CPC ........... *G05B 19/4186* (2013.01); *G05B 2219/31365* (2013.01); *Y02P 90/14* (2015.11); *Y02P 90/185* (2015.11)

(58) Field of Classification Search
CPC .................................................. G05B 15/02
See application file for complete search history.

(56) References Cited

U.S. PATENT DOCUMENTS 6,941,557 B1 9/2005 Jakobson et al.
7,539,724 B1 * 5/2009 Callaghan .......... G05B 19/4185
700/9

(Continued)

FOREIGN PATENT DOCUMENTS

JP 2013-038601 A 2/2013
KR 10-2003-0021537 A 3/2003

(Continued)

OTHER PUBLICATIONS

Product Overview, WIN-911 Software, Jan. 13, 2015, 2 pgs.

(Continued)

*Primary Examiner* — Tri Hoang

(57) ABSTRACT

A method includes obtaining information associated with multiple events in an industrial process control and automation system, where the information is obtained from one or more sources of data related to the industrial process control and automation system. The method also includes outputting the information to a notification system configured to generate multiple notifications for mobile end-user devices using the retrieved information. Obtaining the information associated with the multiple events includes using one or more queries to obtain at least part of the information from at least one of the one or more sources. The one or more queries support detection of events from the at least one source that is not configured or able to provide event information to the notification system.

20 Claims, 12 Drawing Sheets

Related U.S. Application Data filed on May 14, 2015, provisional application No. 62/161,548, filed on May 14, 2015, provisional application No. 62/161,558, filed on May 14, 2015, provisional application No. 62/161,622, filed on May 14, 2015, provisional application No. 62/161,644, filed on May 14, 2015, provisional application No. 62/161,657, filed on May 14, 2015.

(56) References Cited

U.S. PATENT DOCUMENTS

| | | |
|---|---|---|
| 2007/0297557 A1 | 12/2007 | Kuwatani |
| 2011/0276165 A1 | 11/2011 | Ko et al. |
| 2012/0029678 A1 | 2/2012 | McGreevy et al. |
| 2012/0079282 A1 | 3/2012 | Lowenstein et al. |
| 2013/0212186 A1* | 8/2013 | Camp ............ G05B 19/042 709/206 |
| 2014/0047107 A1 | 2/2014 | Maturana et al. |
| 2014/0121789 A1 | 5/2014 | Brandes et al. |
| 2014/0344369 A1 | 11/2014 | Goldberg et al. |
| 2015/0007265 A1 | 1/2015 | Aissi et al. |
| 2015/0077263 A1 | 3/2015 | Ali et al. |

FOREIGN PATENT DOCUMENTS

| | | |
|---|---|---|
| KR | 10-1077591 B1 | 10/2011 |
| KR | 10-2012-0087235 A | 8/2012 |
| KR | 10-2013-0006760 A | 1/2013 |
| KR | 10-2014-0059788 A | 5/2014 |
| KR | 10-2014-0103859 A | 8/2014 |

OTHER PUBLICATIONS

Product Overview, WIN-911 Enterprise Edition, Feb. 27, 2014, 2 pgs.
Product Data Sheet, WIN-911 Software, Mobile Edition, Smartphone Data Sheet, Sep. 25, 2015, 2 pgs.
Specter Instruments, WIN-911/Lite, Jan. 2005, 2 pgs.
Product Overview, WIN-911 Version 7, Feb. 11, 2014, 2 pgs.
Specter Instruments, Technical Brief, WEB-911 XTools, Jan. 26, 2009, 1 pg.
Technical Brief, "WIN-911 Version 7.17.00, Changes and Enhancements: General WIN-911: V6.18 to V7.17.00", Sep. 10, 2015, 15 pgs.
User's Manual, "WIN-911 V7.12", Oct. 11, 2011, 582 pgs.
Andrew Duca, "Apparatus and Method for Protecting Propietary Information Over Public Notification Infrastructure", U.S. Appl. No. 14/863,006, filed Sep. 23, 2015.
Matthew G. Burd et al., "Apparatus and Method for Universal Annotation in Industrial Process Control and Automation System", U.S. Appl. No. 14/866,857, filed Sep. 29, 2015.
Andrew Duca et al., "Apparatus and Method for Automated Event Notification Read Receipt to Support Non-Repudiated Auditing or Other Functions in Industrial Process Control and Automation System", U.S. Appl. No. 14/868,168, filed Sep. 28, 2015.
Matthew G. Burd et al., "Apparatus and Method for Providing Event Context With Notifications Related to Industrial Process Control and Automation System", U.S. Appl. No. 14/868,058, filed Sep. 28, 2015.
Andrew Duca et al., "Apparatus and Method for Translating Industrial Process Control and Automation System Events Into Mobile Notifications", U.S. Appl. No. 14/869,629, filed Sep. 29, 2015.
Graeme Laycock et al., "Apparatus and Method for Using Configurable Rules Linking Triggers With Actions to Support Notifications Associated With Industrial Process Control and Automation System", U.S. Appl. No. 14/869,890, filed Sep. 29, 2015.
Notification of Transmittal of the International Search Report and the Written Opinion of the international Searching Authority, or the Declaration dated Jul. 28, 2016 in connection with International Patent Application No. PCT/US2016/030037.
Notification of Transmittal of the International Search Report and the Written Opinion of the International Searching Authority, or the Declaration dated Aug. 9, 2016 in connection with international Patent Application No. PCT/US2016/029758.
Notification of Transmittal of the International Search Report and the Written Opinion of the International Searching Authority, or the Declaration dated Jul. 28 2016 in connection with International Patent Application No. PCT/US2016/029953.
Notification of Transmittal of the International Search Report and the Written Opinion of the International Searching Authority, or the Declaration dated Jul. 28. 2016 in connection with International Patent Application No. PCT/US2016/030012.
Notification of Transmittal of the International Search Report and the Written Opinion of the International Searching Authority, or the Declaration dated Aug. 9, 2016 in connection with International Patent Application No. PCT/US2016/030377.
Notification of Transmittal of the International Search Report and the Written Opinion of the International Searching Authority, or the Declaration dated Jul. 28. 2016 in connection with International Patent Application No. PCT/US2016/029964.

* cited by examiner

APPARATUS AND METHOD FOR EVENT DETECTION TO SUPPORT MOBILE NOTIFICATIONS RELATED TO INDUSTRIAL PROCESS CONTROL AND AUTOMATION SYSTEM

CROSS-REFERENCE TO RELATED APPLICATIONS AND PRIORITY CLAIM

This application claims priority under 35 U.S.C. § 119(e) to the following U.S. provisional patent applications:

U.S. Provisional Patent Application No. 62/161,536 filed on May 14, 2015 and entitled "APPARATUS AND METHOD FOR TRANSLATING INDUSTRIAL PROCESS CONTROL AND AUTOMATION SYSTEM EVENTS INTO MOBILE NOTIFICATIONS";

U.S. Provisional Patent Application No. 62/161,542 filed on May 14, 2015 and entitled "APPARATUS AND METHOD FOR USING CONFIGURABLE RULES LINKING TRIGGERS WITH ACTIONS TO SUPPORT NOTIFICATIONS ASSOCIATED WITH INDUSTRIAL PROCESS CONTROL AND AUTOMATION SYSTEM";

U.S. Provisional Patent Application No. 62/161,548 filed on May 14, 2015 and entitled "APPARATUS AND METHOD FOR AUTOMATED EVENT NOTIFICATION READ RECEIPT TO SUPPORT NON-REPUDIATED AUDITING IN INDUSTRIAL PROCESS CONTROL AND AUTOMATION SYSTEM";

U.S. Provisional Patent Application No. 62/161,558 filed on May 14, 2015 and entitled "APPARATUS AND METHOD FOR EVENT DETECTION TO SUPPORT MOBILE NOTIFICATIONS RELATED TO INDUSTRIAL PROCESS CONTROL AND AUTOMATION SYSTEM";

U.S. Provisional Patent Application No. 62/161,622 filed on May 14, 2015 and entitled "APPARATUS AND METHOD FOR PROTECTING PROPRIETARY INFORMATION OVER PUBLIC NOTIFICATION INFRASTRUCTURE";

U.S. Provisional Patent Application No. 62/161,644 filed on May 14, 2015 and entitled "APPARATUS AND METHOD FOR PROVIDING EVENT CONTEXT WITH NOTIFICATIONS RELATED TO INDUSTRIAL PROCESS CONTROL AND AUTOMATION SYSTEM"; and U.S. Provisional Patent Application No. 62/161,657 filed on May 14, 2015 and entitled "APPARATUS AND METHOD FOR UNIVERSAL ANNOTATION IN INDUSTRIAL PROCESS CONTROL AND AUTOMATION SYSTEM".

All of these provisional patent applications are hereby incorporated by reference in their entirety.

TECHNICAL FIELD

This disclosure relates generally to industrial process control and automation systems. More specifically, this disclosure relates to an apparatus and method for event detection to support mobile notifications related to an industrial process control and automation system.

BACKGROUND

Industrial process control and automation systems are often used to automate large and complex industrial processes. These types of systems routinely include sensors, actuators, and controllers. The controllers are often arranged hierarchically in a control and automation system. For example, lower-level controllers are often used to receive measurements from the sensors and perform process control operations to generate control signals for the actuators. Higher-level controllers are often used to perform higher-level functions, such as planning, scheduling, and optimization operations. Human operators routinely interact with controllers and other devices in a control and automation system, such as to review warnings, alarms, or other notifications and make adjustments to control or other operations.

SUMMARY

This disclosure provides an apparatus and method for event detection to support mobile notifications related to an industrial process control and automation system.

In a first embodiment, a method includes obtaining information associated with multiple events in an industrial process control and automation system, where the information is obtained from one or more sources of data related to the industrial process control and automation system. The method also includes outputting the information to a notification system configured to generate multiple notifications for mobile end-user devices using the retrieved information. Obtaining the information associated with the multiple events includes using one or more queries to obtain at least part of the information from at least one of the one or more sources. The one or more queries support detection of events from the at least one source that is not configured or able to provide event information to the notification system.

In a second embodiment, an apparatus includes at least one processing device configured to obtain information associated with multiple events in an industrial process control and automation system from one or more sources of data related to the industrial process control and automation system. The at least one processing device is also configured to output the information to a notification system configured to generate multiple notifications for mobile end-user devices using the retrieved information. The at least one processing device is configured to use one or more queries to obtain at least part of the information from at least one of the one or more sources. The one or more queries support detection of events from the at least one source that is not configured or able to provide event information to the notification system.

In a third embodiment, a non-transitory computer readable medium contains computer readable program code that, when executed, causes at least one processing device to obtain information associated with multiple events in an industrial process control and automation system from one or more sources of data related to the industrial process control and automation system. The medium also includes computer readable program code that, when executed, causes the at least one processing device to output the information to a notification system configured to generate multiple notifications for mobile end-user devices using the retrieved information. The computer readable program code that, when executed, causes the at least one processing device to obtain the information includes computer readable program code that, when executed, causes the at least one processing device to use one or more queries to obtain at least part of the information from at least one of the one or more sources. The one or more queries support detection of events from the at least one source that is not configured or able to provide event information to the notification system.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
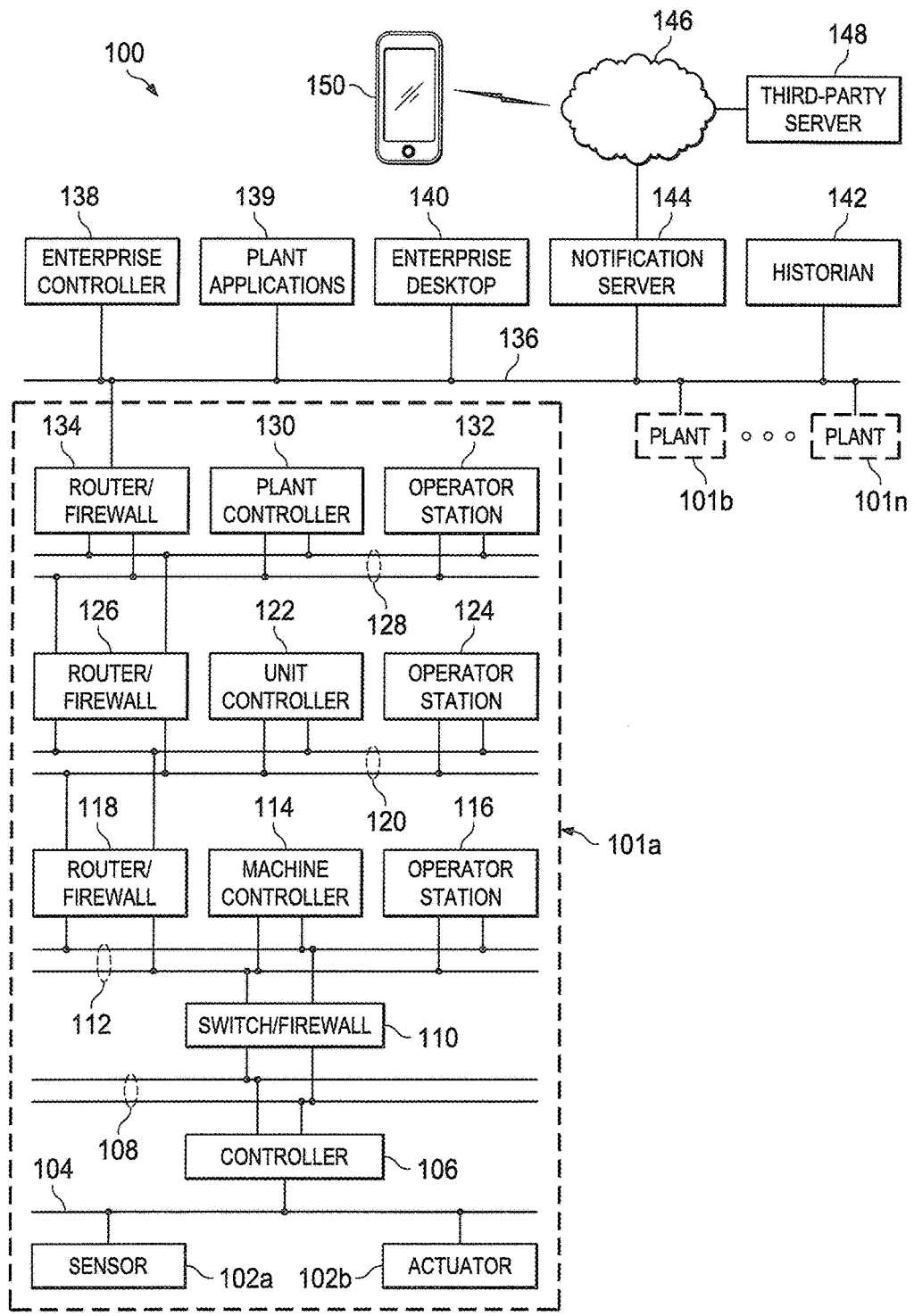
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Various plant applications 139 could also be executed in the system 100. In this example, the plant applications 139 are shown as residing on Level 5 of the system 100, although plant applications 139 could reside on other or additional levels of the system 100. The plant applications 139 could represent any suitable applications that are executed by server computers or other computing devices.

Access to the enterprise-level controllers 138 and plant applications 139 may be provided by one or more enterprise desktops (also referred to as operator stations) 140. Each of the enterprise desktops 140 includes any suitable structure for supporting user access and control of one or more components in the system 100. Each of the enterprise desktops 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 142 can be coupled to the network 136. The historian 142 could represent a component that stores various information about the system 100. The historian 142 could, for instance, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 and each of the operator stations 116, 124, 132, 140 could include one or more processing devices and one or more memories for storing instructions and data used, generated, or collected by the processing device(s). Each of the controllers 106, 114, 122, 130, 138 and each of the operator stations 116, 124, 132, 140 could also include at least one network interface, such as one or more Ethernet interfaces or wireless transceivers, facilitating communication over one or more networks or communication paths.

The widespread use of mobile "smart" devices (such as APPLE IPHONEs and IPADs and ANDROID devices) allows users to remain connected and to interact with remote computing devices from virtually anywhere each user travels. Among other things, this could allow personnel associated with an industrial process control and automation system to receive warnings, alerts, or other notifications associated with events and other information and trigger actions associated with the control and automation system, regardless of whether the personnel are physically located at an industrial site. For example, events that are generated in a process control and automation system are often presented to operators currently on shift in one or more control rooms. There may also typically be a need or desire to inform users outside of control rooms, outside of an industrial plant, or while off network of events that are happening in the control and automation system. These events can come from a variety of applications, such as from a distributed control system (DCS) itself, advanced process control applications, operations applications, or business applications. Delivery of notifications describing these events to a user's handheld mobile device enables the user to receive notifications virtually anywhere and at any time.

To support this functionality, the system 100 includes a notification server 144, which receives data from other component(s) of the system 100 and generates notifications for users. For example, the notification server 144 could receive information identifying different events that occur with the system 100. The events could be associated with any suitable activities or conditions in the system 100, such as the generation of warnings or alerts by other components in the system 100. The notification server 144 could receive this information in any suitable manner and from any suitable source(s), such as from a historian, controller, or plant application. The notification server 144 uses this information to generate notifications (such as push notifications) and other messages to be sent to appropriate users. The notification server 144 could also provide additional information to appropriate users in response to user interactions with those notifications or other messages.

The notification server 144 communicates over a third-party network 146 with a third-party server 148. The third-party network 146 generally represents any suitable communication network(s) outside the system 100 (and therefore out of the control of the owners/operators of the system 100). The third-party network 146 could, for example, represent the Internet, a cellular communication network, or other network or combination of networks. The third-party server 148 represents a server used to provide notifications to end-user devices 150. For example, the third-party server 148 could push notifications to the end-user devices 150, allow retrieval of notifications by the end-user devices 150 at specified intervals or when requested, or provide notifications in any other suitable manner. The end-user devices 150 can then connect to the notification server 144 over the network 146 to receive details about notifications and events or to query for any notifications. As a particular example, the third-party server 148 could be used by companies like APPLE, SAMSUNG, or GOOGLE to provide push notifications or other notifications to mobile devices.

The end-user devices 150 denote any suitable user devices that can receive and present notifications to users. Examples of end-user devices 150 include smartphones, tablet computers, or other communication/computing devices. Specific examples could include APPLE IPHONEs, APPLE IPADs, and ANDROID devices.

In order to support the generation of notifications related to a process control and automation system, the notification server 144 implements a general-purpose event detection component that allows configurable queries to be registered with the server 144. The configurable queries are then executed to obtain information from one or more source systems (such as one or more controllers, historians, or other components in the system). The configurable nature of this detection component enables detection from source applications that are not natively built on a base platform or for which modification of the originating system is not possible. Upon receipt of information from a source system, the detection component generates one or more events that are processed by the platform and transformed into notifications, and the notifications can then be sent to at least one end-user device 150. Note that the events could also be generated by other components, and the notification server 144 could receive indications of those events rather than generating the events.

In some embodiments, the detection component can be implemented in two parts. The first part can represent at least one general data access element that has the ability to retrieve data from one or more source systems. This can be done in a variety of ways, such as through the creation and configuration of at least one data access plug-in that has specific knowledge on how to retrieve data from one or more source systems. Note that if needed or desired, multiple data access plug-ins could be used to retrieve data from multiple source systems. The second part can represent at least one configurable polling component that holds the configuration of the types of events being looked for and that interacts with the first part on a configurable basis for retrieving information from one or more source systems. A successful query from the second part through the first part returns new events that have been recorded in the source system(s) since the last time the source system(s) was/were queried. With these results, the individual events can be propagated through the notification server 144, which is configured to transform the events into notifications for the end-user devices 150.

In this way, information about events associated with an industrial process control and automation system can be collected from a variety of sources and used to generate notifications for mobile end-user devices. This allows personnel to maintain situational awareness with respect to the control and automation system even when the personnel are outside of a control room or other typical work location.

Although FIG. 1 illustrates one example of an industrial process control and automation system 100, various changes may be made to FIG. 1. For example, a control and automation system could include any number of sensors, actuators, controllers, operator stations, networks, servers, end-user devices, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which information related to an industrial process control and automation system can be collected and used to generate notifications for user devices. This functionality can be used in any other suitable system.

Figure 2:
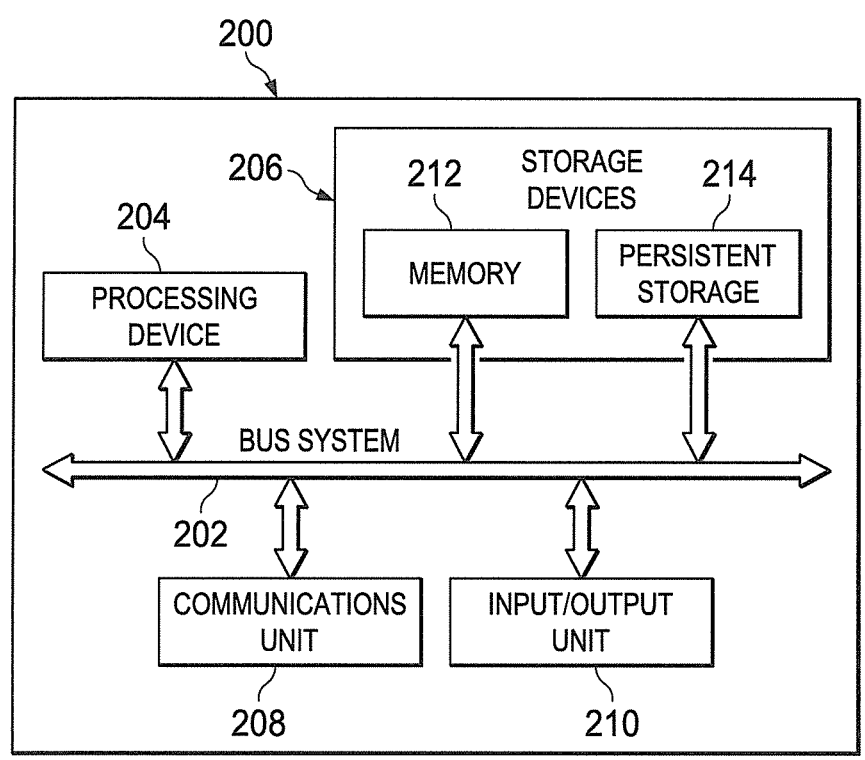
FIG. 2 illustrates an example device for event detection to support mobile notifications related to an industrial process control and automation system according to this disclosure.

FIG. 2 illustrates an example device 200 for event detection to support mobile notifications related to an industrial process control and automation system according to this disclosure. The device 200 could, for example, represent the notification server 144 or the end-user device 150 in the system 100 of FIG. 1. However, the notification server 144 or the end-user device 150 could be implemented using any other suitable device or system, and the device 200 could be used in any other suitable system.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a ready only memory, hard drive, Flash memory, or optical disc.

The communications unit 208 supports communications with other systems or devices. For example, the communications unit 208 could include a network interface that facilitates communications over at least one Ethernet, HART, FOUNDATION FIELDBUS, or other network. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

When implementing the notification server 144, the device 200 could execute instructions used to perform any of the functions associated with the notification server 144. For example, the device 200 could execute instructions that implement at least one data access element with the ability to retrieve data from one or more source systems. The device 200 could also execute instructions that implement at least one polling component that interacts with the data access element(s) to retrieve information from the source system(s). The device 200 could further execute instructions that transform event information into notifications and that transmit the notifications for delivery to end-user devices 150.

When implementing the end-user device 150, the device 200 could execute instructions used to perform any of the functions associated with the end-user device 150. For example, the device 200 could execute instructions that process notifications and present information to users.

Although FIG. 2 illustrates one example of a device 200 for event detection to support mobile notifications related to an industrial process control and automation system, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
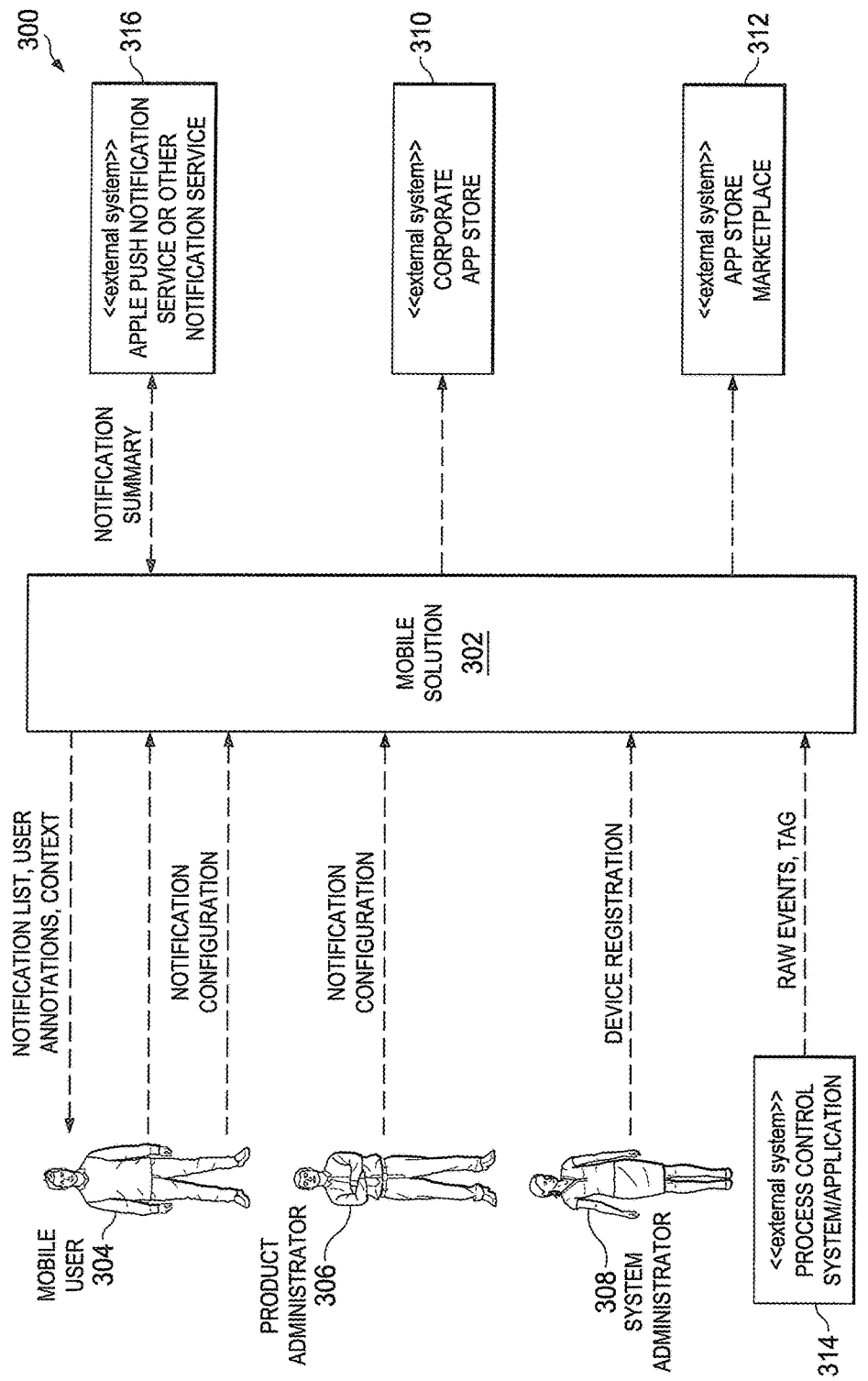
FIG. 3 illustrates an example context model for event detection to support mobile notifications related to an industrial process control and automation system according to this disclosure.

FIG. 3 illustrates an example context model 300 for event detection to support mobile notifications related to an industrial process control and automation system according to this disclosure. For ease of explanation, the context model 300 is described as being supported by the industrial process control and automation system 100 of FIG. 1. However, the context model 300 could be supported by any other suitable system.

As shown in FIG. 3, the context model 300 includes a mobile solution 302, which generally denotes at least part of the functionality of the notification server 144 and the application executed by the end-user devices 150. The mobile solution 302 interacts with three types of users 304-308 in this example, namely mobile users 304, product administrators 306, and system administrators 308. The mobile users 304 generally denote end users who use the end-user devices 150 to receive notifications and optionally act on those notifications. For example, the mobile users 304 could use the end-user devices 150 to review notifications regarding events in the industrial process control and automation system 100, provide comments or other annotations related to the events, and interact with other users to resolve undesirable or problematic situations in the system 100. Note, however, that the notifications could be used in any other suitable manner. The mobile users 304 could also have the ability to configure or control the notifications that are sent to those mobile users 304, such as by defining different rules used to generate the notifications.

The product administrators 306 represent users who configure the functionality of the mobile solution 302. For example, the product administrators 306 could define rules or other logic that control the generation of the notifications. As a particular example, the product administrators 306 could create rules that define the notifications sent in response to various events, the users who receive those notifications, and the contents of those notifications. In some embodiments, rules can be defined for different roles, and associations of users to those roles can be used to identify the mobile users 304 who receive notifications for those roles. As noted above, end users can also create their own rules for notifications, and the product administrators 306 could have the ability to review, modify, or delete the end user-created rules.

The system administrators 308 represent users who are responsible for allowing the mobile application executed by the end-user devices 150 to be authorized in their environment. For example, the system administrators 308 could grant permissions for end-user devices 150 to access the mobile solution 302 and register the end-user devices 150 with the mobile solution 302.

The application executed by the end-user devices 150 could be provided via an electronic store or marketplace, such as a corporate store 310 or a third-party store 312. Each electronic store 310-312 generally represents a computing system hosting one or more applications or "apps" that can be downloaded to the end-user devices 150. As the names imply, the corporate store 310 denotes a computing system operated by a corporation or other entity associated with the industrial process control and automation system 100 or other system. The third-party store 312 denotes a computing system operated by a third party unrelated to the industrial process control and automation system 100 or other system, such as APPLE or GOOGLE. End users can use their end-user devices 150 to access one or more of the electronic stores 310-312 and download an app that supports the use of notifications related to industrial process control and automation.

Once configured and placed into operation, the mobile solution 302 receives information about events from various sources, such as one or more process control systems or applications 314. Each process control system or application 314 could represent any component within the industrial process control and automation system 100 that can generate events or data indicative of events. In some instances, a process control system or application 314 can be designed to specifically integrate with the mobile solution 302, and the process control system or application 314 can itself provide events with or without tags (event-related information) to the mobile solution 302. In other instances, a process control system or application 314 may be unable to provide this information to the mobile solution 302 itself, and a plug-in or other mechanism can be used with the process control system or application 314 to identify events and transmit information to the mobile solution 302.

However the events are detected, the mobile solution 302 receives information about the events and uses rules or other logic to generate notifications for mobile users 304. The mobile solution 302 also sends the notifications to the end-user devices 150 of the mobile users 304. In some embodiments, the notifications are sent to the mobile users 304 directly via a third-party notification service 316, which could denote a service provided by the third-party server 148. The third-party notification service 316 could include an APPLE or ANDROID push notification service, although other push or non-push notification services could be used. The third-party notification service 316 provides the notifications to the end-user devices 150 used by the mobile users 304. Alternatively, the mobile solution 302 can generate obfuscated messages (such as unique alphanumeric codes, brief summaries, or other obfuscations) for the generated notifications, and the obfuscated messages can be sent to the third-party notification service 316 for delivery to the mobile users 304 as obfuscated notifications. The obfuscated notifications can be used by the end-user devices 150 to securely interact with the mobile solution 302 in order to obtain and present non-obfuscated notifications to the mobile users 304.

In whatever manner the notifications are provided to the end-user devices 150, the end-user devices 150 can present the notifications to the mobile users 304. For example, an end-user device 150 can receive and present a listing of notifications for a particular mobile user 304, where the listing identifies the notification messages, their associated identifiers, and some (or possibly all) of the fields of the notification messages. Annotations or other text-based communications associated with those notifications can also be provided to or received from the end-user device 150. Annotations could include communications such as comments from users or read receipts, forwarding indicators, or other system-generated annotations. In addition, context (such as detailed historical data for one or more process variables) can be provided to the end-user device 150. Note, however, that notifications can be used in any other suitable manner and that any other suitable data associated with the notifications can be sent to or received from the end-user devices 150.

Although FIG. 3 illustrates one example of a context model 300 for event detection to support mobile notifications related to an industrial process control and automation system, various changes may be made to FIG. 3. For example, additional types of users could be associated with the mobile solution 302, or functions of multiple user types could be combined. Also, while specific entities such as APPLE and ANDROID are described above, other stores or notification services could be used. In addition, various components could be added, omitted, combined, further subdivided, or placed in any other suitable configuration according to particular needs.

FIGS. 4 and 5A through 5D illustrate an example system model 400 for event detection to support mobile notifications related to an industrial process control and automation system according to this disclosure. For ease of explanation, the system model 400 is described as being supported by the industrial process control and automation system 100 of FIG. 1. However, the system model 400 could be supported by any other suitable system. Also, in the following discussion, it is assumed that obfuscated notifications are sent to the end-user devices 150 via the third-party notification service 316 and that the end-user devices 150 request non-obfuscated notifications securely from the notification server 144. However, other mechanisms for providing notifications to the end-user devices 150 could be used, such as direct delivery of non-obfuscated notifications via the third-party notification service 316.

Figure 4:
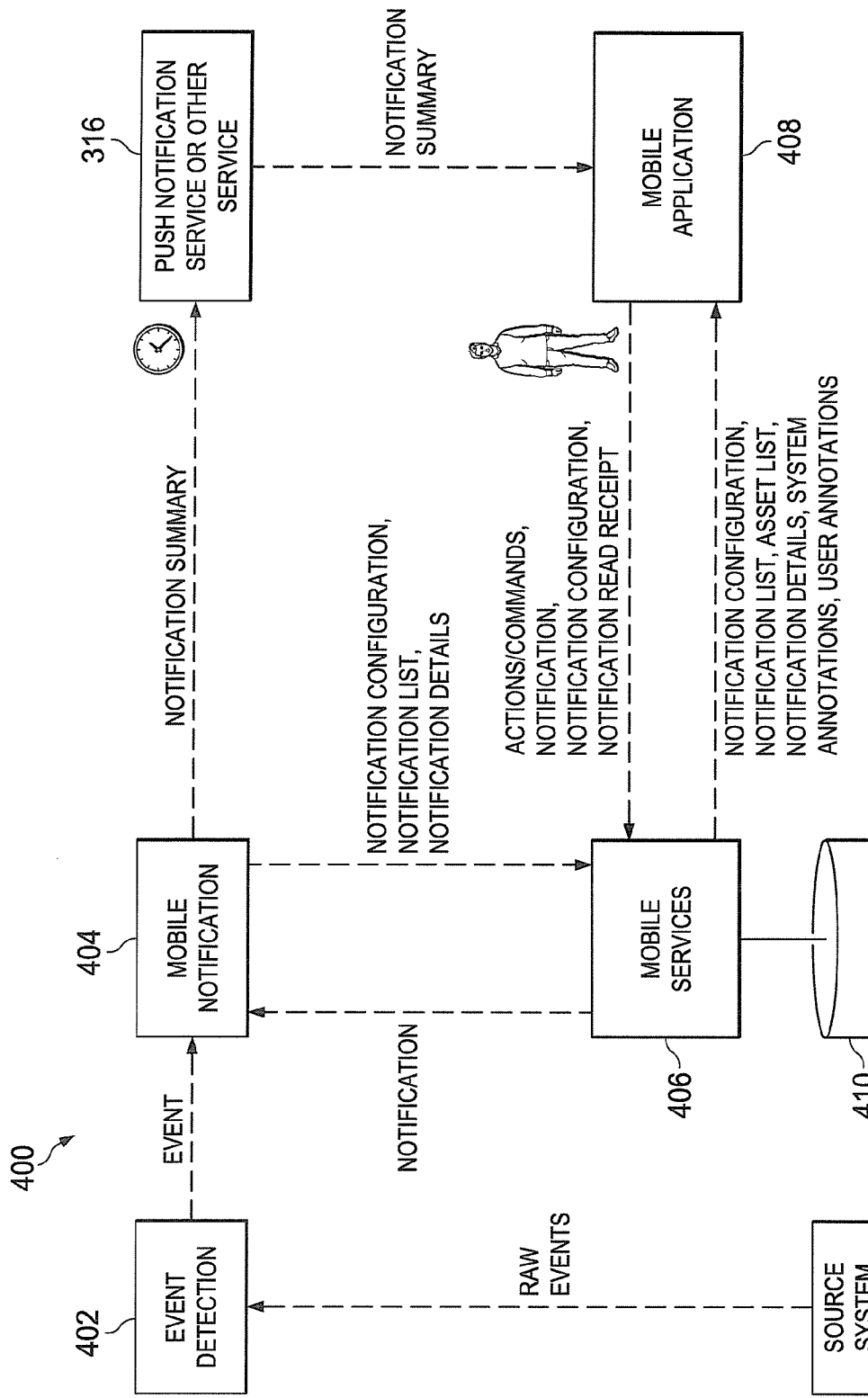
FIGS. 4 and 5A through 5D illustrate an example system model for event detection to support mobile notifications related to an industrial process control and automation system according to this disclosure.
Figure 5A:
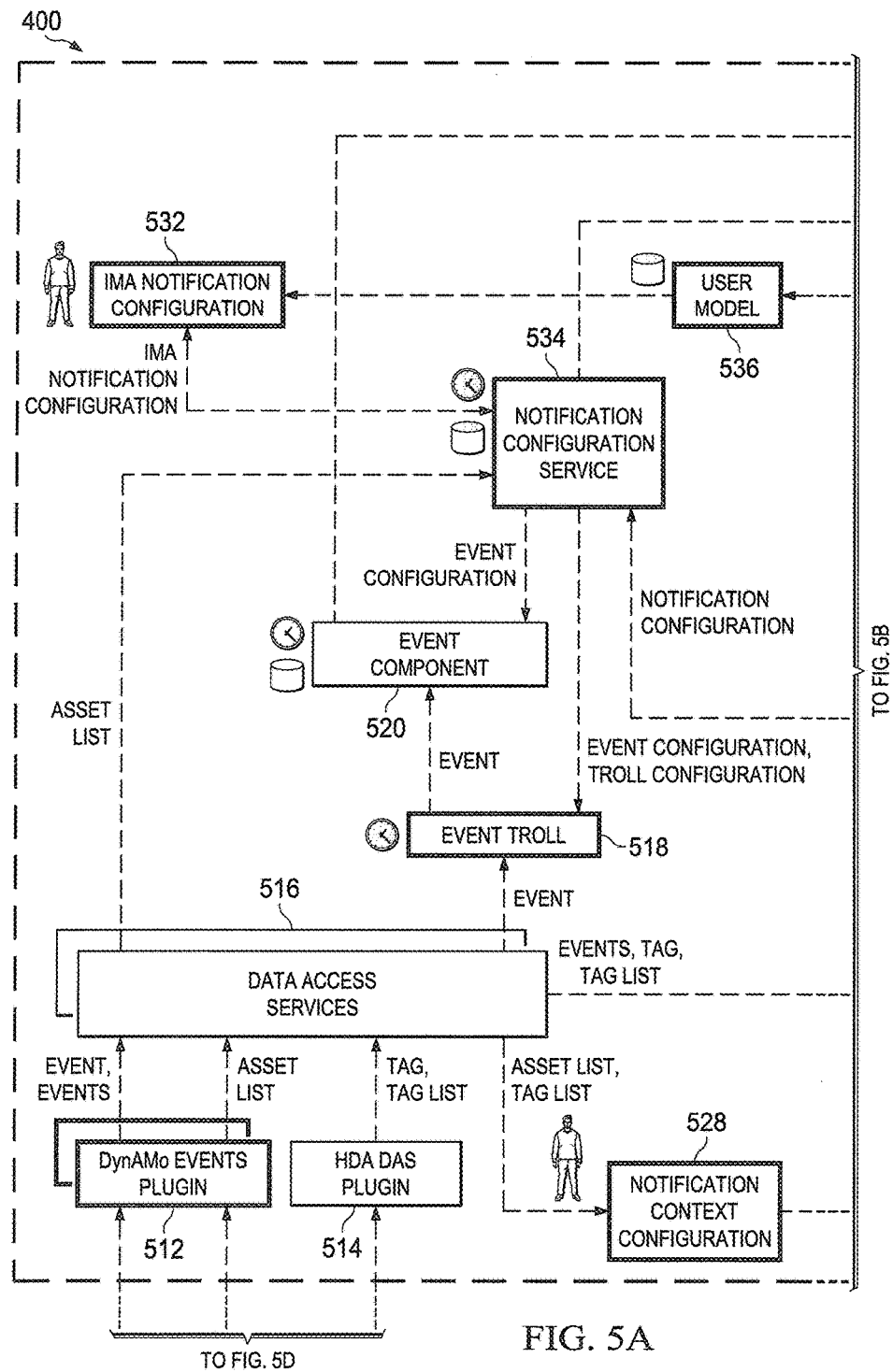
Figure 5B:
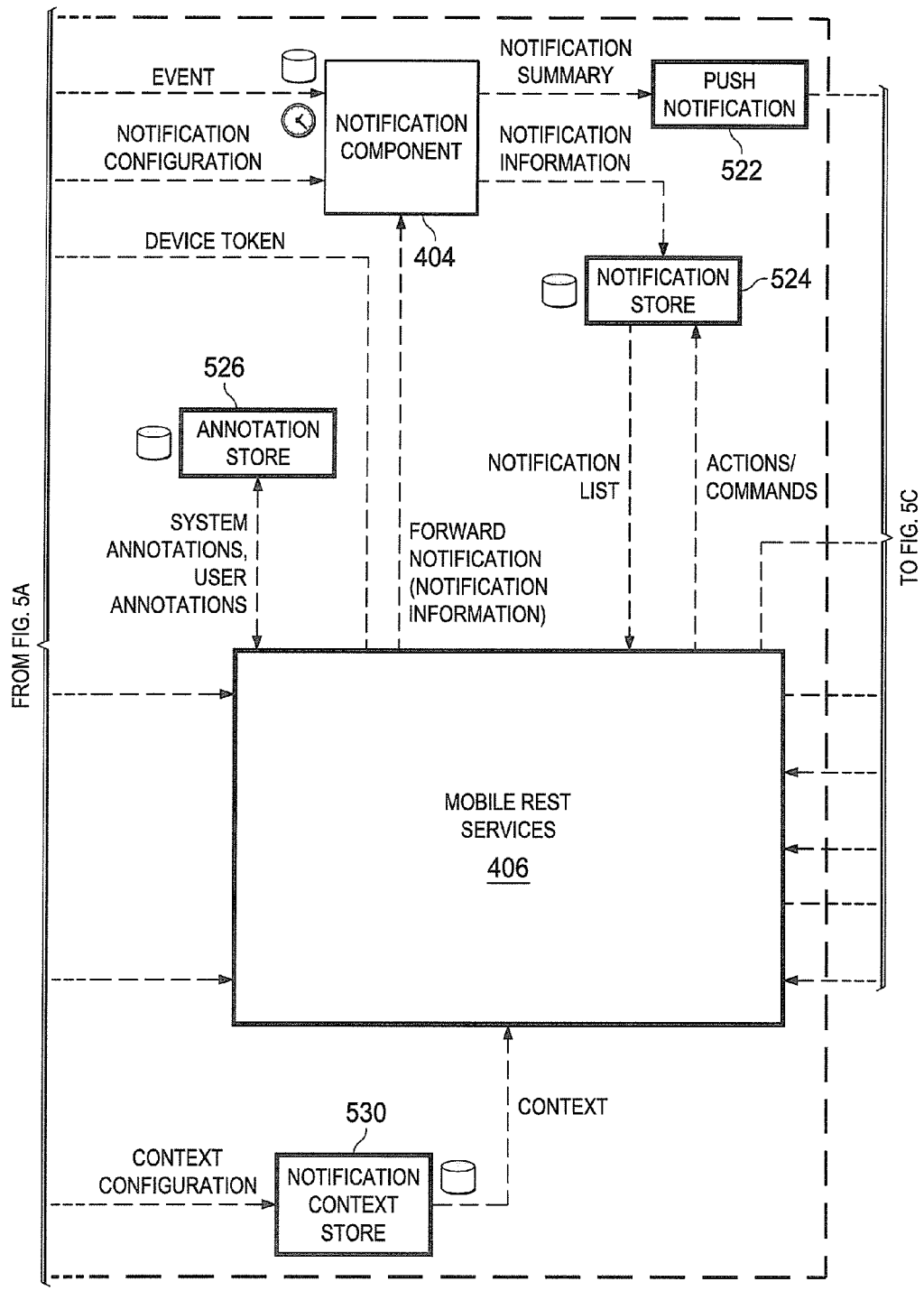
Figure 5C:
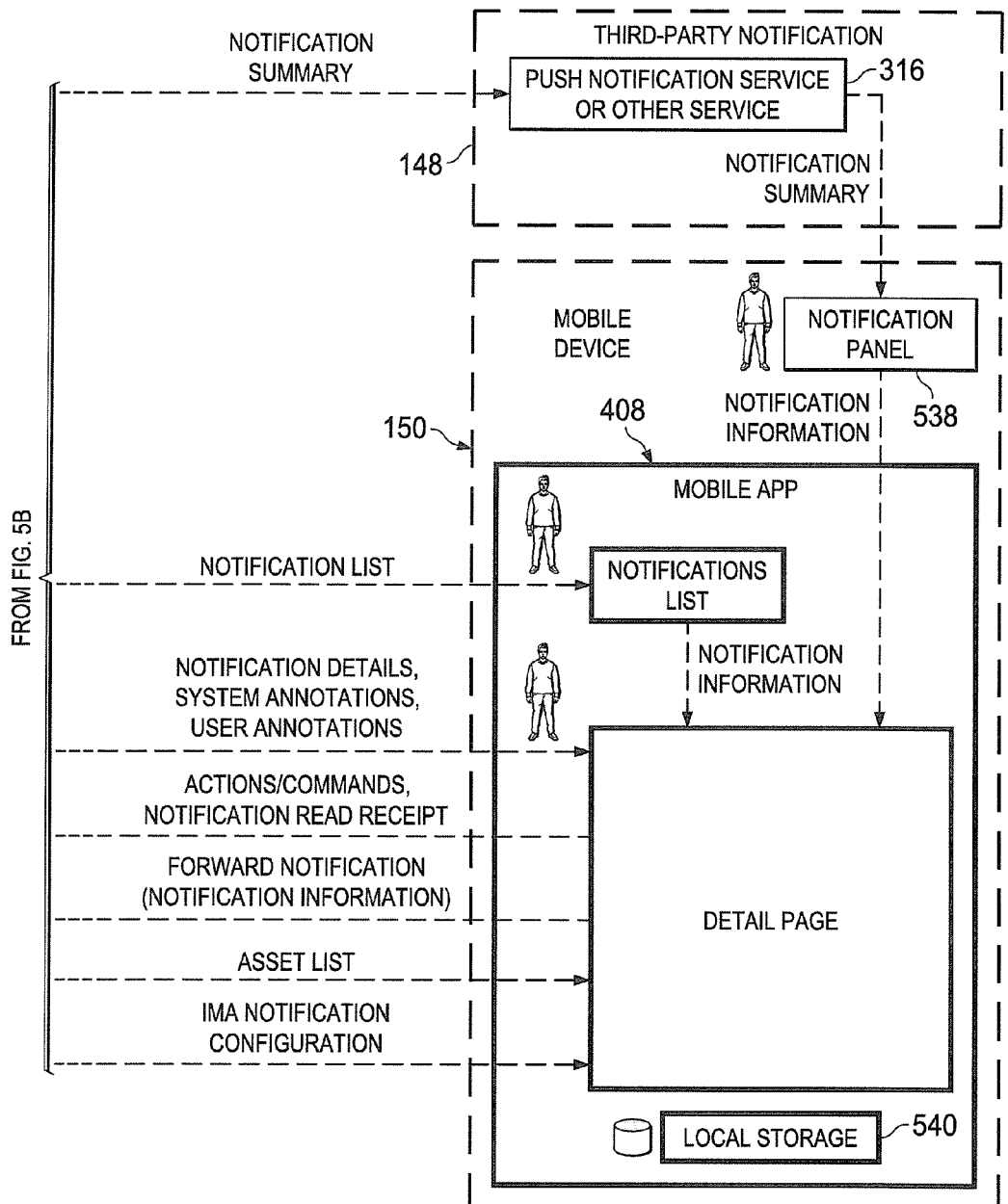
Figure 5D:
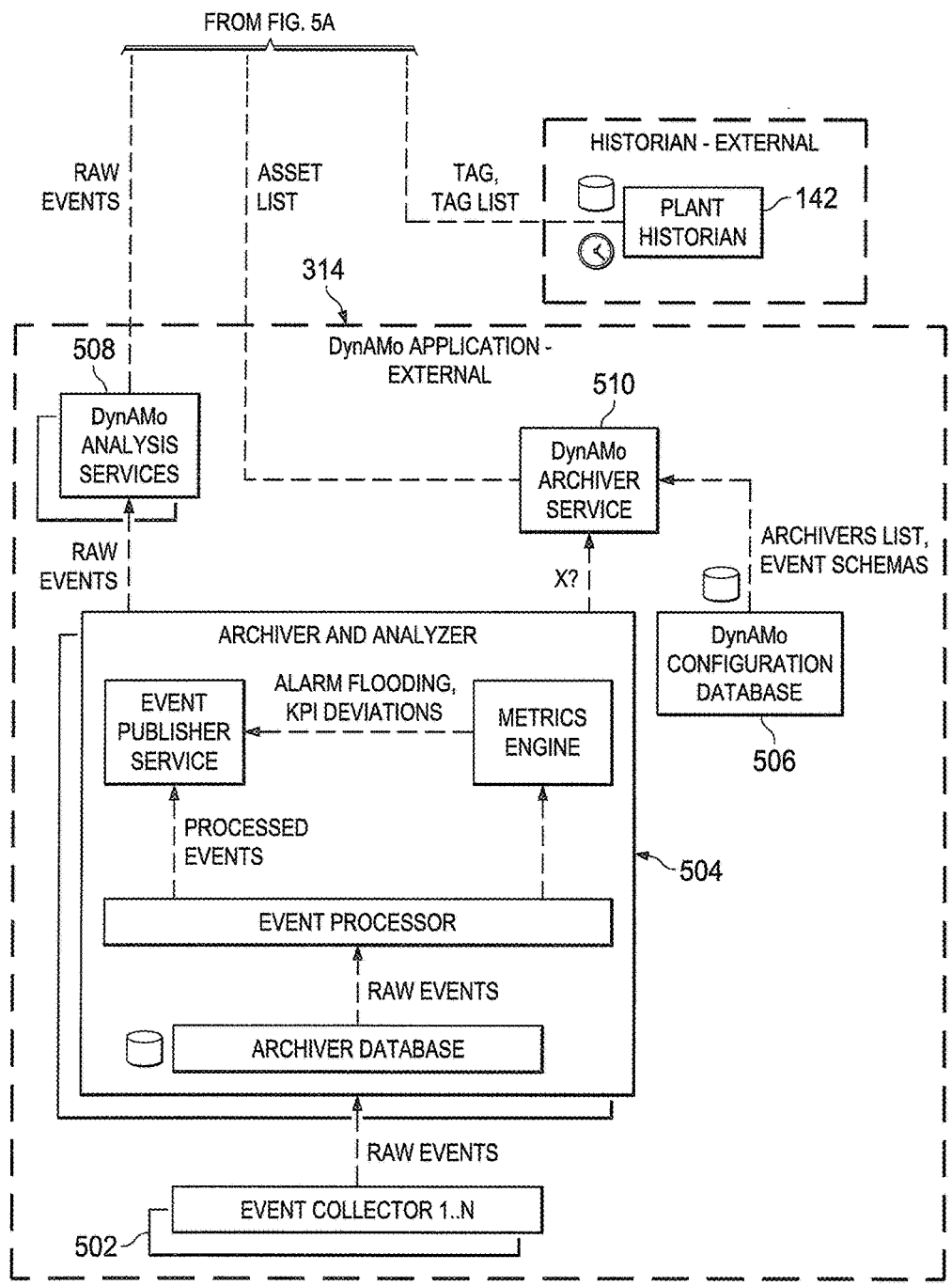

As shown in FIG. 4, the system model 400 includes an event detection unit 402, a mobile notification unit 404, and a mobile services unit 406. These units 402-406 could, for example, denote different functional units of the mobile solution 302. Each of the units 402-406 could be implemented using any suitable hardware or a combination of hardware and software/firmware instructions. For instance, each of the units 402-406 could be implemented using one or more software routines executed by the processing device(s) 204 of the notification server 144.

The event detection unit 402 receives information associated with events, such as from one or more process control systems or applications 314. The information associated with the events could include information such as a time of an event, a source of the event, a condition associated with the event, a category (such as minor, major, or critical) of the event, and a description of the event. The event detection unit 402 can obtain the information about the events in any suitable manner. For example, the event detection unit 402 could poll the process control systems or applications 314 at specified intervals, in response to triggering events, or at other times. The event detection unit 402 could also receive the information from plug-ins or other data collection components in or associated with the process control systems or applications 314 at specified intervals, in response to triggering events, or at other times. The events here could represent all events generated by the process control systems or applications 314 or only a subset of events generated by the process control systems or applications 314 (such as only certain types of events). The event detection unit 402 processes the information and outputs information identifying the events, such as in a standard format, to the mobile notification unit 404.

The mobile notification unit 404 receives the information identifying the events from the event detection unit 402 and generates obfuscated notifications for end-user devices 150. For example, the mobile notification unit 404 can generate non-obfuscated notifications containing suitable information about the events, generate unique identifiers for the non-obfuscated notifications, and generate obfuscated notifications that include the unique identifiers. The obfuscated notifications (referred to in FIG. 4 as notification summaries) are sent to the third-party notification service 316 for delivery to mobile applications 408. The mobile applications 408 represent an application executed by one or more end-user devices 150. The mobile notification unit 404 also provides various information, such as lists of notifications and the notifications themselves, to the mobile services unit 406.

The mobile services unit 406 interacts with each mobile application 408 securely, such as by using Virtual Private Network (VPN) or other secure communication protocol. The mobile services unit 406 performs various functions related to notifications. For example, the mobile services unit 406 could receive unique identifiers or other obfuscations from the mobile applications 408, retrieve non-obfuscated notifications associated with those obfuscations, and provide the non-obfuscated notifications to the mobile applications 408. The mobile services unit 406 can also manage lists of notifications that particular users have received, manage read-receipts for notifications that are read or viewed on the users' end-user devices 150, and allow rules to be configured by the end-user devices 150. The mobile services unit 406 can further provide user-generated or system-generated annotations to the end-user devices 150 and receive user annotations from end-user devices 150 for delivery to other end-user devices 150. In addition, the mobile services unit 406 can receive invocations of various commands from the end-user devices 150, such as commands for obtaining historical data, user comments, or other contextual information about a specific notification.

FIGS. 5A through 5D illustrate additional details of an example implementation of the system model 400. In this example, one of the process control systems or applications 314 denotes the DYNAMO application from HONEYWELL INTERNATIONAL INC. This application supports the use of one or more event collectors 502, one or more archivers and analyzers 504, a configuration database 506, one or more analysis services 508, and an archiver service 510. Each event collector 502 collects information defining events from an underlying source, such as via OLE for Process Control (OPC) or Open Database Connectivity (ODBC). Each archiver and analyzer 504 includes an archiver that maps information obtained by the associated collector from the underlying source's format into raw events and an event processor that generates processed events using the raw events. Each archiver and analyzer 504 also includes an event publisher service that publishes the processed events and a metrics engine that calculates one or more metrics regarding the processed events. The configuration database 506 stores various information related to the application, such as a list of archivers, event types, and event collectors. Each analysis service 508 outputs published events to external components based on one or more filtering conditions. The archiver service 510 outputs lists of archivers and lists of assets.

Information from various sources is provided to one or more plug-ins 512-514, each of which interacts with at least one data access service (DAS) 516. While two specific types of plug-ins are shown in FIGS. 5A through 5D, the number and type of plug-ins can vary based on the sources that provide information in the system. The plug-in 512 is designed to interact with the DYNAMO application. There could be multiple instances of the plug-in 512, such as one for each archiver and analyzer 504. Also, the multiple instances of the plug-in 512 could be configured in a single instance of a DAS 516, and the plug-in's configuration can be stored via the DAS 516. Each instance of the plug-in 512 can connect to and obtain events from the associated archiver and analyzer 504. The plug-in 514 is designed to fetch data from a plant historian 142, such as via OPC Historical Data Access (HDA).

Each instance of the DAS 516 collects events and other information from one or more sources, such as via one or more plug-ins. Each instance of the DAS 516 also makes the collected events and other information available to other components. For example, an event troll 518 can retrieve events from the DAS 516. In some embodiments, the event troll 518 performs a periodic call to the DAS 516 for new events, such as every five minutes, and the DAS 516 emits detected events to the event troll 518 in response to the call. The event troll 518 can process the events to determine which events satisfy rules or other logic, and events that do so are provided to other components for use in generating notifications. The event troll 518 can also use an event configuration to filter the events provided to the other components. The event configuration identifies which applications have registered themselves as event producers with their associated event types and definitions (referred to as "event schema").

Events collected by the event troll 518 are provided to an event component 520, which provides event routing capabilities. Applications can therefore publish events of their choosing without the need for knowledge of interested receivers of those events (called subscribers). The subscribers can register their interest for events with the event component 520, such as by specifying filtering characteristics like event type(s), content(s), and source(s). These filtering characteristics are used by the event component 520 to route received events to interested subscribers.

One event subscriber is the mobile notification unit 404, referred to here as a notification component. The notification unit 404 is responsible for dispatching notifications about events to end-user devices 150. For example, the notification unit 404 can generate push notifications 522 (such as those containing obfuscated messages). The push notifications 522 are provided to the third-party notification service 316 and can be cached for later retrieval in a notification store 524. For example, the notification store 524 can provide the notifications to the mobile services unit 406, implemented in this example using Representational State Transfer (REST).

As noted above, the mobile services unit 406 provides notifications to the end-user devices 150, exchanges data (such as annotations) with the end-user devices 150, and supports the execution of various commands invoked by the end-user devices 150. Annotations (such as system- or user-generated annotations) can be stored in an annotation store 526. Also as noted above, the mobile services unit 406 can provide context (such as detailed historical data for one or more process variables) for the notifications to the end-user device 150. To support this, a notification context configuration unit 428 can be used to configure related information pertaining to an asset. For example, the notification context configuration unit 428 can receive an asset list from the plug-in 512 and a tag list from the plug-in 514 via the DAS 516. Users can map which tags are related to specific assets, and that information can be placed in a notification context store 530. When an event is raised for an asset, the mobile services unit 406 can use the information in the notification context store 530 to identify what additional contextual information should be provided to the end-user device(s) 150.

The system model 400 further includes a notification configuration unit 532 and a notification configuration service 534. The notification configuration unit 532 can be used by administrators to configure notifications for events, such as by configuring notifications for events generated for specific assets or for specific users. The configurations can be stored for use by the event processors in the application or system 314 and by the mobile notification unit 404. In some embodiments, the notification configuration unit 532 supports an HTML-based user interface with various modes. In a user-centric mode, an administrator could select a user, then select an asset (only permissible assets may be shown based on the selected user), and then select an event type to be defined. In an asset-centric mode, an administrator could select an asset, then select a user, and then select an event type to be defined. The notification configuration unit 532 can also be used to configure other features of the system, such as the frequency at which the event troll 518 performs periodic calls to the DAS 516.

The notification configuration service 534 stores notification-specific data, such as the event troll's frequency. Also, for user-interested events where mobile users have defined rules for notifications, the notification configuration service 534 is responsible for translating those rules into event component-specific and notification component-specific data. The notification configuration service 534 can then update the event component 520 and the mobile notification unit 404 with that data.

A user model 536 stores information related to the mobile users 304 or their end-user devices 150. For example, the user model 536 could store a mapping of mobile devices to device registration tokens, where the mapping is used to determine a list of devices that are to receive a notification. The user model 536 could also store a listing of users to whom notifications can be sent or forwarded. The user model 536 can allow multiple device registration tokens to be associated with each user, and the user model 536 could support "contact lists" for use in sending or forwarding the notifications.

The end-user device 150 in FIGS. 5A through 5D can present notifications in a notification panel 538, such as the panel that appears when a smartphone is in a standby or locked state and a notification is received. When the user opens the mobile application 408, the user can be provided with a list of notifications and, in response to the selection of a particular notification, with a detailed page about the selected notification. The end-user device 150 also includes a local storage 540, which can be used to store mobile application settings and notification information.

Although FIGS. 4 and 5A through 5D illustrate one example of a system model 400 for event detection to support mobile notifications related to an industrial process control and automation system, various changes may be made to FIGS. 4 and 5A through 5D. For example, various components could be added, omitted, combined, further subdivided, or placed in any other suitable configuration according to particular needs. Also, various components in FIGS. 4 and 5A through 5D (such as components 402-406) could be implemented using a common device, or at least some of those components could be implemented using different devices. Further, while particular technologies are shown in FIGS. 5A through 5D (such as DYNAMO and REST), these are for illustration only. In addition, while not shown, certain applications or systems 314 could be integrated into the mobile solution so that the use of plug-ins and data access services is not required. In such situations, events from those integrated applications or systems could be provided directly to the event troll 518 or the event component 520.

Figure 6:
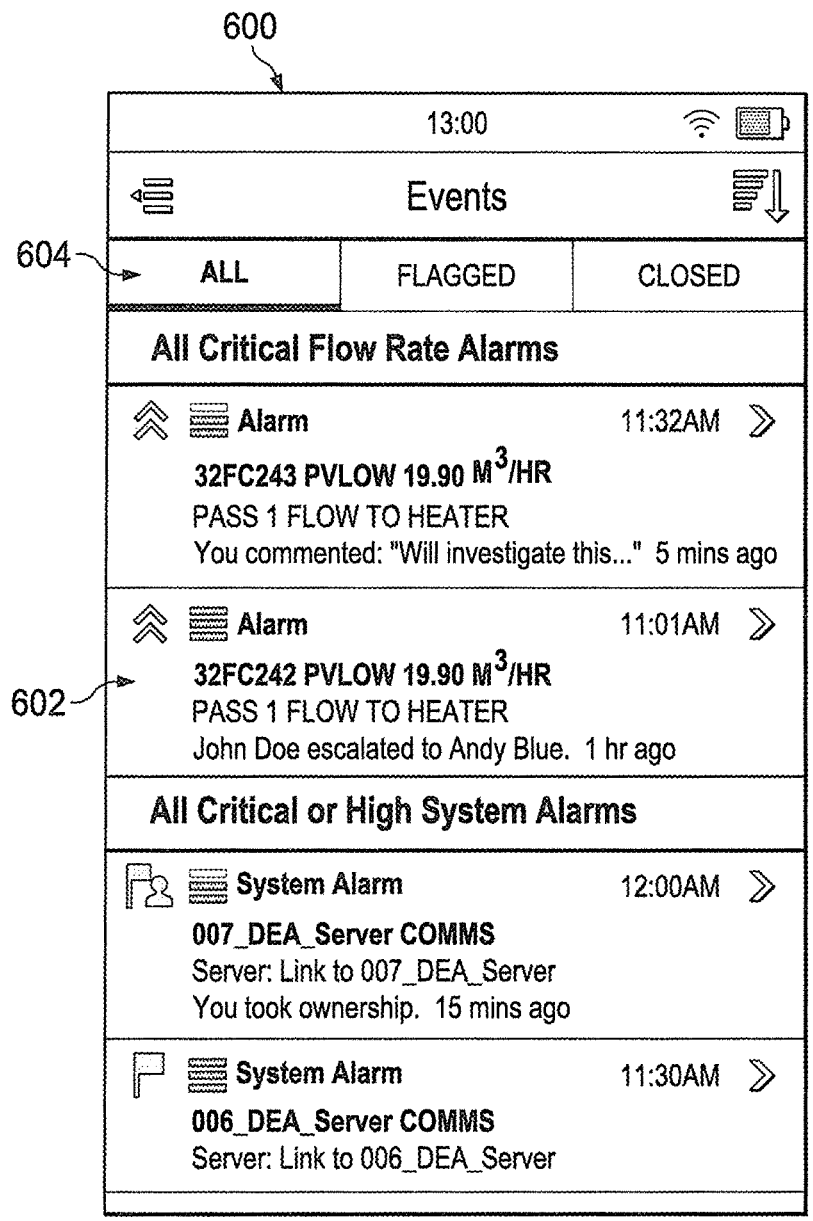
FIGS. 6 through 8 illustrate example notifications related to an industrial process control and automation system according to this disclosure.
Figure 7:
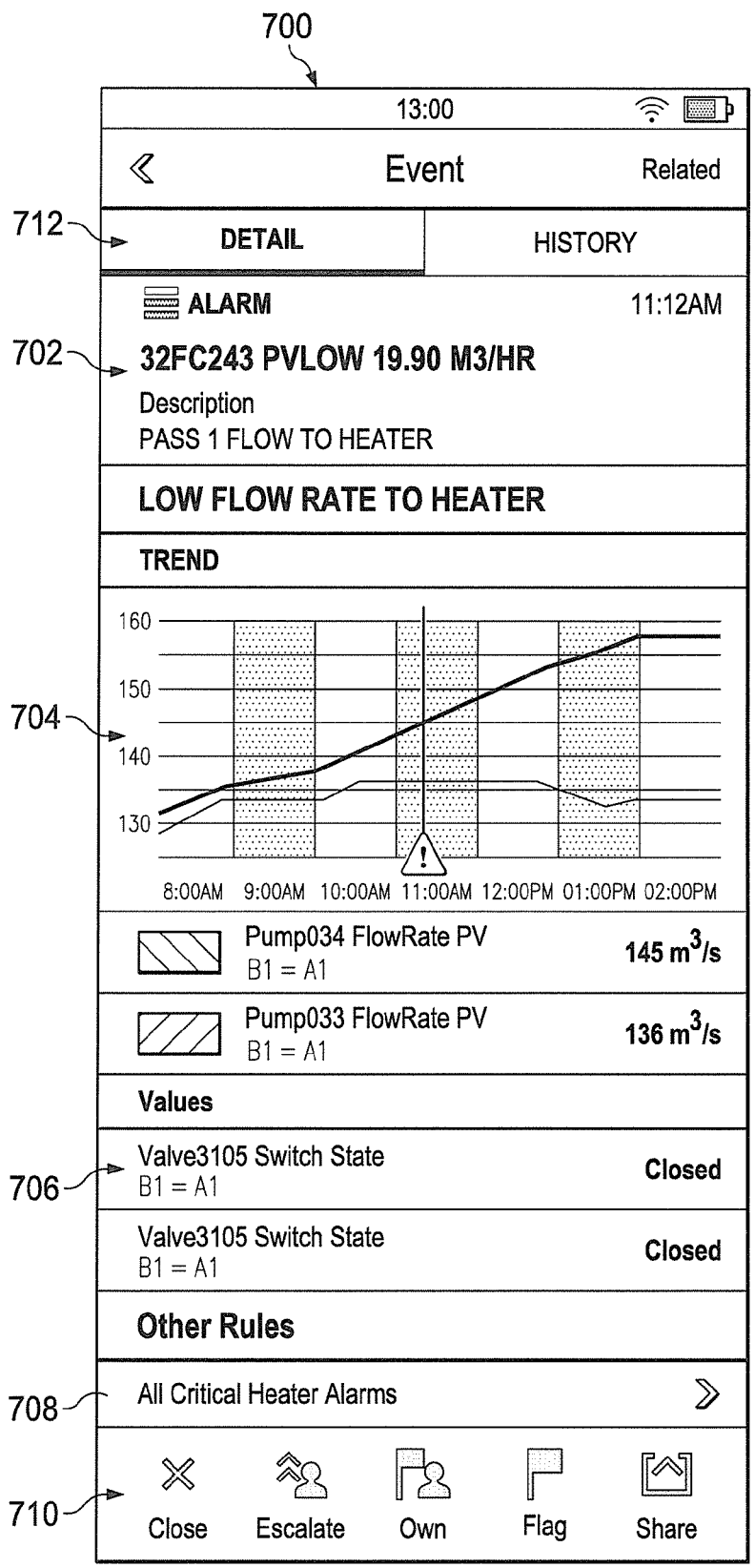
Figure 8:
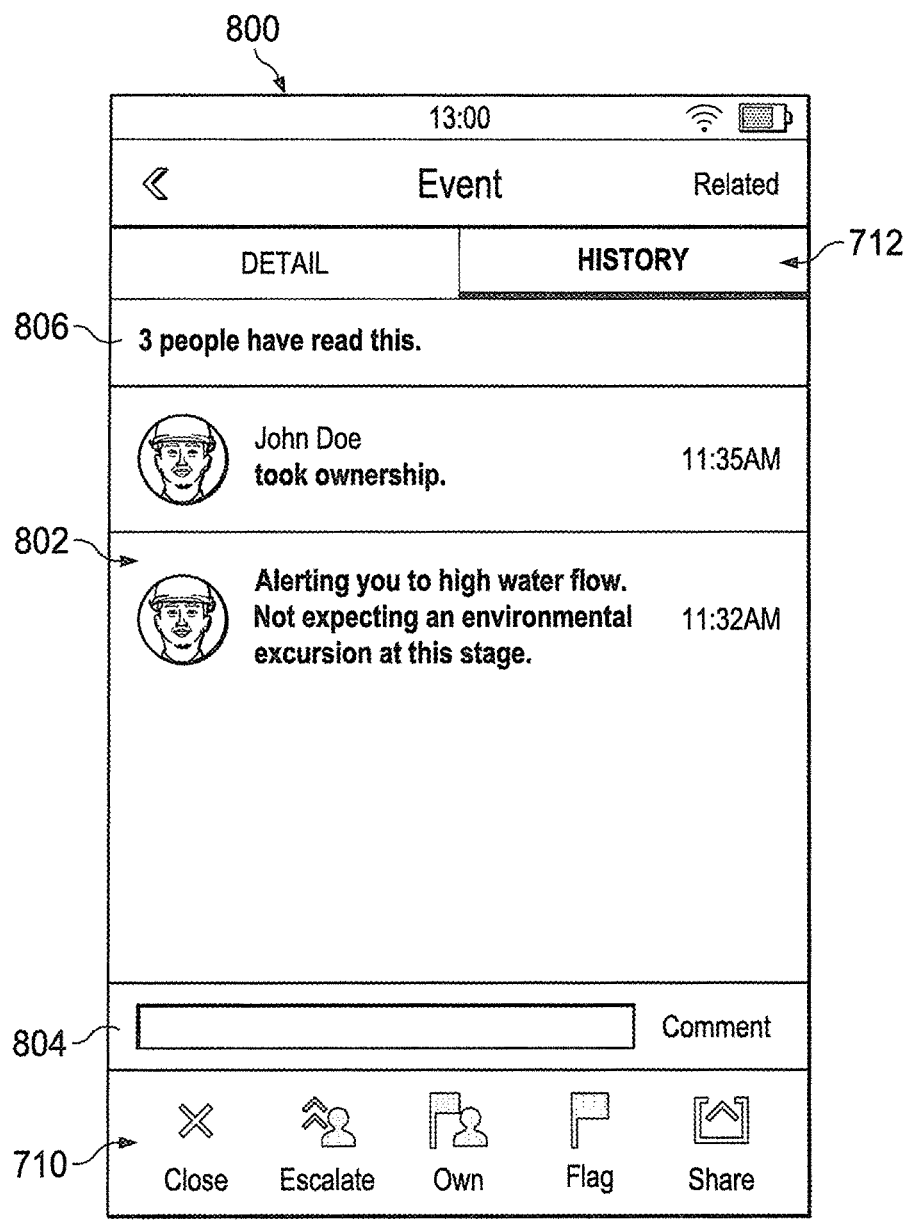

FIGS. 6 through 8 illustrate example notifications related to an industrial process control and automation system according to this disclosure. As shown in FIG. 6, a graphical user interface 600 can be presented by the mobile application 408 on the display screen of an end-user device 150. The graphical user interface 600 here includes a listing of notifications 602. Each notification 602 includes various details about an event, such as a name and severity of the event, a time of the notification, and comments about the event. As shown in this example, the notifications 602 are grouped into different categories, although other categories or arrangements could be used. The graphical user interface 600 also includes various controls 604, such as controls for viewing all notifications, flagged notifications, or closed notifications and controls for changing the viewing arrangement.

Selection of a specific notification 602 in the graphical user interface 600 could cause the mobile application 408 to present a graphical user interface 700 as shown in FIG. 7. The graphical user interface 700 includes information 702 identifying a particular event and a trend diagram 704 showing historical values of one or more process variables associated with the particular event. The graphical user interface 700 also includes specific process variable values 706 associated with the event and an identification of the rule(s) 708 that triggered the notification or that are related to the notification. Moreover, the graphical user interface 700 includes controls 710 that allow a user to close a notification, escalate the notification to one or more specific users, own the notification (meaning the user will be responsible for resolving the event), flag the notification (so it appears as a flagged notification in FIG. 6), or share the notification with other users.

In addition, the graphical user interface 700 includes tabs 712 that can be used to select whether detailed information or historical information associated with the selected notification is being presented to the user. In FIG. 7, the "Detail" tab has been selected. Selection of the "History" tab can present content in a graphical user interface 800 as shown in FIG. 8. The graphical user interface 800 here includes the controls 710 and the tabs 712. The graphical user interface 800 also identifies any user comments 802 associated with the selected notification, along with a text entry box 804 that allows entry of a comment related to the selected notification. Any comment entered through the text entry box 804 can be sent from the end-user device 150 to the notification server 144 for delivery to other users who receive the notification.

The graphical user interface 800 further includes a read receipt summary 806, which identifies the number of users who have viewed/read the selected notification. The read receipt summary 806 can represent a link, which can be selected by the user to view an identification of users who have opened, viewed, or read the notification.

Although FIGS. 6 through 8 illustrate examples of notifications related to an industrial process control and automation system, various changes may be made to FIGS. 6 through 8. For example, the content and arrangement of each graphical interface are for illustration only. Also, while shown as being used with an APPLE IPHONE, the notifications could be used with any other suitable devices.

Figure 9:
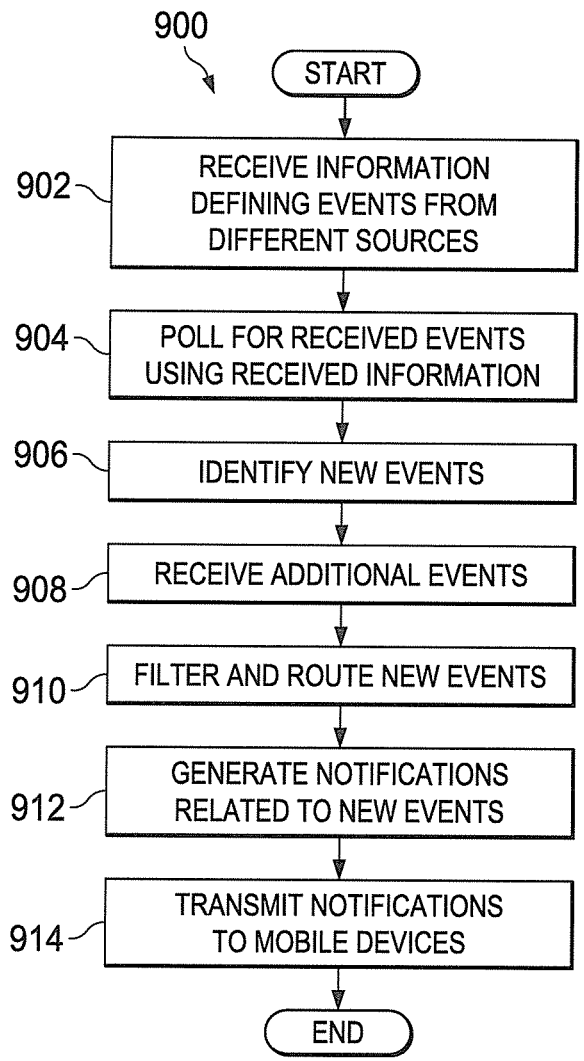
FIG. 9 illustrates an example method for event detection to support mobile notifications related to an industrial process control and automation system according to this disclosure.

FIG. 9 illustrates an example method 900 for event detection to support mobile notifications related to an industrial process control and automation system according to this disclosure. As shown in FIG. 9, information associated with multiple events is received from multiple sources at step 902. This could include, for example, the event detection unit 402 obtaining event information from multiple process control systems or applications 314 and/or process historians 142. As a particular example, this could include one or more instances of the DAS 516 collecting event information from the plug-ins 512-514.

A poll for received events occurs at step 904, and new events are identified at step 906. This could include, for example, the event detection unit 402 using the received information to identify new events that have occurred. As a particular example, this could include the event troll 518 polling the DAS 516 for new events at a periodic interval. The periodic interval may or may not be configurable.

Additional events can optionally be received at step 908. This could include, for example, the event detection unit 402, mobile notification unit 404, or mobile services unit 406 receiving information defining additional events directly from one or more process control systems or applications 314. These systems or applications 314 could natively support the output of events to the mobile solution 302 or be modified to support the output of events to the mobile solution 302. Events from these systems or applications 314 can therefore be obtained without requiring the use of plug-ins or other techniques.

The new events are filtered and routed at step 910. This could include, for example, the event detection unit 402 identifying events of interest and routing the events to the mobile notification unit 404 or the mobile services unit 406. As a particular example, this could include the event troll 518 providing the new events to the event component 520, where the event component 520 uses filtering characteristics specified by subscribers to identify which new events to route to the mobile notification unit 404 or the mobile services unit 406.

Notifications are generated for at least some of the new events at step 912 and transmitted to mobile devices at step 914. This could include, for example, the mobile notification unit 404 using one or more rules to identify one or more users to receive a notification associated with each event. Each rule could identify the condition(s) to be met in order to satisfy the rule and the contents of a notification to be generated if the condition(s) is/are satisfied. This could also include the mobile notification unit 404 generating a unique identifier or other obfuscation for each notification and interacting with the third-party notification service 316 to transmit the obfuscation as part of an obfuscated notification to one or more end-user devices 150. This could further include the mobile services unit 406 establishing a VPN or other secure connection with the end-user devices 150 and providing a non-obfuscated notification to the end-user devices 150. Note, however, that the use of obfuscations and obfuscated notifications is not required, and the mobile notification unit 404 or the mobile services unit 406 could provide non-obfuscated notifications to the end-user devices 150 via the third-party notification service 316 or in some other manner.

Although FIG. 9 illustrates one example of a method 900 for event detection to support mobile notifications related to an industrial process control and automation system, various changes may be made to FIG. 9. For example, while each figure shows a series of steps, various steps in each figure could overlap, occur in parallel, occur in a different order, or occur any number of times. Also, each method could include any number of events, event information retrievals, and notifications.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining, at a notification server, information associated with multiple events in an industrial process control and automation system, the information obtained from multiple sources of data related to the industrial process control and automation system;
   generating, at the notification server, multiple notifications for mobile end-user devices using the obtained information; and
   sending, by the notification server, the multiple notifications to the mobile end-user devices over a third-party network;
   wherein obtaining the information associated with the multiple events comprises (i) using one or more queries to obtain a first part of the information from a first source of the multiple sources and (ii) obtaining a second part of the information from a second source of the multiple sources without using the one or more queries, the second source configured to provide event information without using the one or more queries; and
   wherein the one or more queries support detection of events from the first source, wherein the first source is not configured to provide event information to the notification server.

2. The method of claim 1, wherein obtaining the first part of the information from the first source comprises:
   receiving the first part of the information using one or more plug-ins, each plug-in configured to access and retrieve data from the first source.

3. The method of claim 2, wherein receiving the first part of the information using the one or more plug-ins comprises:
   receiving the first part of the information from the one or more plug-ins using one or more data access services; and
   polling the one or more data access services for the first part of the information.

4. The method of claim 3, wherein polling the one or more data access services comprises repeatedly polling the one or more data access services at a user-defined interval.

5. The method of claim 1, further comprising:
   filtering the obtained information to identify events of interest;
   wherein generating multiple notifications comprises generating notifications for the events of interest.

6. The method of claim 1, wherein:
   the multiple sources include at least one of: a process control application and a source of historical data.

7. An apparatus comprising:
   at least one processing device configured to:
      obtain information associated with multiple events in an industrial process control and automation system from multiple sources of data related to the industrial process control and automation system;
      generate multiple notifications for mobile end-user devices using the obtained information; and
      send the multiple notifications to the mobile end-user devices over a third-party network;
   wherein the at least one processing device is configured to (i) use one or more queries to obtain a first part of the information from a first source of the multiple sources and (ii) obtain a second part of the information from a second source of the multiple sources without using the one or more queries, the second source configured to provide event information without using the one or more queries; and
   wherein the one or more queries support detection of events from the first source, wherein the first source is not configured to provide event information to the apparatus.

8. The apparatus of claim 7, wherein the at least one processing device is configured to:
   receive the first part of the information using one or more plug-ins, each plug-in configured to access and retrieve data from the first source.

9. The apparatus of claim 8, wherein the at least one processing device is configured to:
   receive the first part of the information from the one or more plug-ins using one or more data access services; and
   poll the one or more data access services for the first part of the information.

10. The apparatus of claim 9, wherein the at least one processing device is configured to repeatedly poll the one or more data access services at a user-defined interval.

11. The apparatus of claim 7, wherein:
   the at least one processing device is further configured to filter the obtained information to identify events of interest; and
   the at least one processing device is configured to generate notifications for the events of interest.

12. The apparatus of claim 7, wherein:
   the multiple sources include at least one of: a process control application and a source of historical data.

13. A non-transitory computer readable medium containing computer readable program code that, when executed, causes at least one processing device to:
   obtain information associated with multiple events in an industrial process control and automation system from multiple sources of data related to the industrial process control and automation system;
   generate multiple notifications for mobile end-user devices using the obtained information; and send the multiple notifications to the mobile end-user devices over a third-party network;

wherein the computer readable program code that, when executed, causes the at least one processing device to obtain the information comprises computer readable program code that, when executed, causes the at least one processing device to (i) use one or more queries to obtain a first part of the information from a first source of the multiple sources and (ii) obtain a second part of the information from a second source of the multiple sources without using the one or more queries, the second source configured to provide event information without using the one or more queries; and wherein the one or more queries support detection of events from the first source, wherein the first source is not configured to provide event information to the at least one processing device.

14. The non-transitory computer readable medium of claim 13, wherein the computer readable program code that, when executed, causes the at least one processing device to obtain the first part of the information from the first source comprises computer readable program code that, when executed, causes the at least one processing device to:

receive the first part of the information using one or more plug-ins, each plug-in configured to access and retrieve data from the first source.

15. The non-transitory computer readable medium of claim 14, wherein the computer readable program code that, when executed, causes the at least one processing device to receive the first part of the information using the one or more plug-ins comprises computer readable program code that, when executed, causes the at least one processing device to:

receive the first part of the information from the one or more plug-ins using one or more data access services; and poll the one or more data access services for the first part of the information.

16. The non-transitory computer readable medium of claim 15, wherein the computer readable program code that, when executed, causes the at least one processing device to poll the one or more data access services comprises:

computer readable program code that, when executed, causes the at least one processing device to repeatedly poll the one or more data access services at a user-defined interval.

17. The non-transitory computer readable medium of claim 13, further containing computer readable program code that, when executed, causes the at least one processing device to filter the obtained information to identify events of interest;

wherein the computer readable program code that, when executed, causes the at least one processing device to generate multiple notifications comprises computer readable program code that, when executed, causes the at least one processing device to generate notifications for the events of interest.

18. The method of claim 1, wherein the third-party network comprises a cellular communication network.

19. The apparatus of claim 7, wherein the third-part network comprises a cellular communication network.

20. The non-transitory computer readable medium of claim 13, wherein the third-party network comprises a cellular communication network.

* * * * *